(12) United States Patent
Huang

(10) Patent No.: US 9,575,549 B2
(45) Date of Patent: Feb. 21, 2017

(54) MOTHERBOARD AND COMPUTER CONTROL SYSTEM INCLUDING THE SAME

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventor: Yong-Zhao Huang, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 256 days.

(21) Appl. No.: 14/579,777

(22) Filed: Dec. 22, 2014

(65) Prior Publication Data

US 2016/0139654 A1    May 19, 2016

(30) Foreign Application Priority Data

Nov. 18, 2014    (CN) .......................... 2014 1 0656410

(51) Int. Cl.
| | | |
|---|---|---|
| H05K 7/10 | (2006.01) |
| G06F 13/00 | (2006.01) |
| G06F 1/00 | (2006.01) |
| G06F 1/26 | (2006.01) |
| G06F 1/32 | (2006.01) |
| G06F 9/44 | (2006.01) |
| G06F 13/40 | (2006.01) |

(52) U.S. Cl.
CPC ............ *G06F 1/3287* (2013.01); *G06F 1/3218* (2013.01); *G06F 1/3243* (2013.01); *G06F 1/3253* (2013.01); *G06F 1/3265* (2013.01); *G06F 9/4418* (2013.01); *G06F 13/4022* (2013.01)

(58) Field of Classification Search
CPC .... G06F 1/3203; G06F 1/3293; G06F 1/3243; G06F 1/3287; G06F 1/324; G06F 1/3265; G06F 9/4418; G06F 1/3231; G06F 1/325
USPC ........ 710/301, 316; 713/300, 320, 323, 322, 713/324
See application file for complete search history.

(56) References Cited

U.S. PATENT DOCUMENTS

| | | | |
|---|---|---|---|
| 6,708,283 B1 * | 3/2004 | Nelvin ................ | G06F 11/2005 710/316 |
| 7,269,750 B1 * | 9/2007 | Garritsen .............. | G06F 1/3203 713/320 |
| 2003/0131172 A1 * | 7/2003 | Lin .......................... | G06F 3/14 710/306 |

(Continued)

*Primary Examiner* — Faisal M Zaman
(74) *Attorney, Agent, or Firm* — Zhigang Ma

(57) ABSTRACT

The disclosure provides a motherboard including a north bridge chipset, a basic input output system (BIOS), a first video graphics array (VGA) connector, and a controlling module. The north bridge chipset outputs a sleep signal to the controlling module, the controlling module obtains a switch signal from the first VGA connector, the controlling module outputs a first mode signal to the north bridge chipset according to the sleep signal and the switch signal, the north bridge chipset controls the computer host to be asleep according to the sleep mode. The disclosure also provides a computer control system including the motherboard. The motherboard and the computer control system control the computer to be asleep via a display.

10 Claims, 3 Drawing Sheets

(56) References Cited

U.S. PATENT DOCUMENTS

2007/0153011 A1\* 7/2007 Wang .................... G06F 3/1431
 345/520
2012/0124267 A1\* 5/2012 Zhang ................ G06F 13/4072
 710/316

\* cited by examiner

MOTHERBOARD AND COMPUTER CONTROL SYSTEM INCLUDING THE SAME

FIELD

The subject matter herein generally relates to a motherboard, and particularly to a computer control system including the motherboard.

BACKGROUND

Typically, a user must remember to manually turn off a workstation before leaving the desk in order to save energy.

BRIEF DESCRIPTION OF THE DRAWINGS

Implementations of the present technology will now be described, by way of example only, with reference to the attached figures.

DETAILED DESCRIPTION

Figure 1:
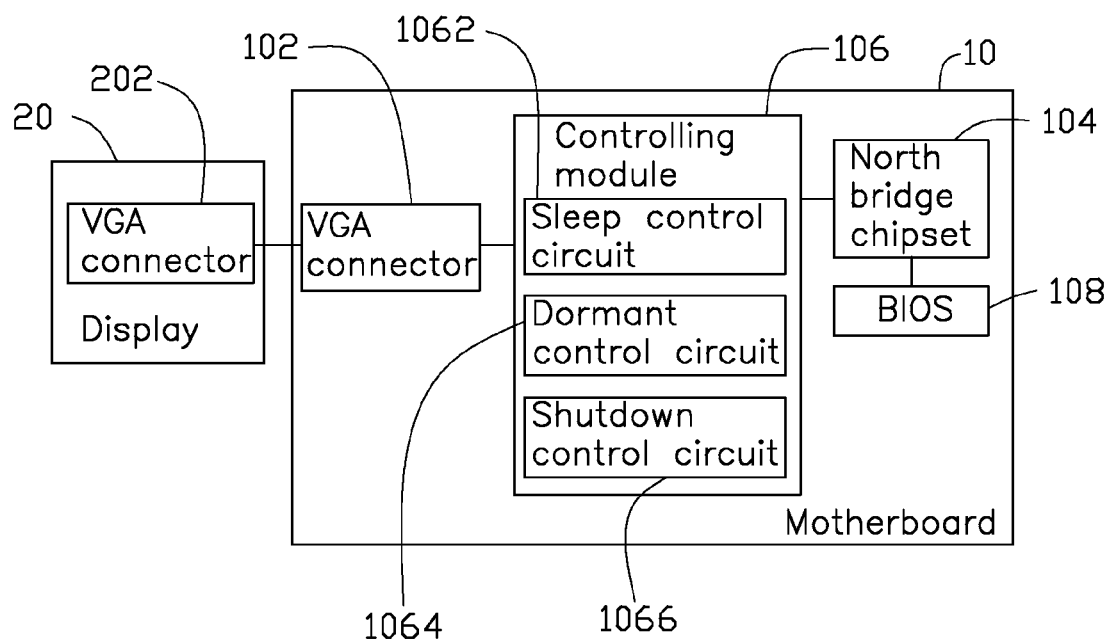
FIG. 1 is a block diagram of an embodiment of a computer control system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrates details and features. The description is not to be considered as limiting the scope of the embodiments described herein.

A definition that applies throughout this disclosure will now be presented.

The term "comprising" means "including, but not necessarily limited to"; it specifically indicates open-ended inclusion or membership in a so-described combination, group, series and the like.

FIG. 1 illustrates an embodiment of a computer control system. The computer control system can comprise a motherboard 10 and a display 20. The motherboard 10 can comprise a north bridge chipset 104, a basic input output system (BIOS) 108, a VGA connector 102, and a controlling module 106. The controlling module 106 is electrically coupled to a VGA connector 202 of the display 20 through the VGA connector 102.

In at least one the embodiment, the VGA connector 102 obtains a switch signal from the VGA connector 202, and transmits the switch signal to the controlling module 106.

In at least one the embodiment, the BIOS 108 can set three work modes of the computer, such as sleep mode, dormant mode, and shutdown mode. When the computer is placed in the sleep mode, the BIOS 108 sets the north bridge chipset 104 to output a sleep signal to the controlling module 106. When the computer is placed in the dormant mode, the BIOS 108 sets the north bridge chipset 104 to output a dormant signal to the controlling module 106. When the computer is placed in the shutdown mode, the BIOS 108 sets the north bridge chipset 104 to output a shutdown signal to the controlling module 106. In at least one the embodiment, the controlling module 106 can comprise a sleep control circuit 1062, a dormant control circuit 1064, and a shutdown control circuit 1066.

The sleep control circuit 1062 can obtain the switch signal from the VGA connector 102 and the sleep control signal from the north bridge chipset 104. The sleep control circuit 1062 outputs a first mode signal to the north bridge chipset 104 according to the switch signal and the sleep control signal, the BIOS sets the north bridge chipset 104 to control the computer to be in a state of sleep when the north bridge chipset 104 obtains the first mode signal.

The dormant control circuit 1064 can obtain the switch signal from the VGA connector 102 and the dormant control signal from the north bridge chipset 104. The dormant control circuit 1064 outputs a second mode signal to the north bridge chipset 104 according to the switch signal and the dormant control signal, the BIOS sets the north bridge chipset 104 to control the computer to be dormant when the north bridge chipset 104 obtains the second mode signal.

The shutdown control circuit 1066 can obtain the switch signal from the VGA connector 102 and the shutdown control signal from the north bridge chipset 104. The sleep control circuit 1066 outputs a third mode signal to the north bridge chipset 104 according to the switch signal and the shutdown control signal, the BIOS sets the north bridge chipset 104 to control the computer to be shutdown when the north bridge chipset 104 obtains the third mode signal.

When the computer is sleeping, dormant, or shutdown, significant electrical consumption is saved compared to leaving the computer fully on.

Figure 2:
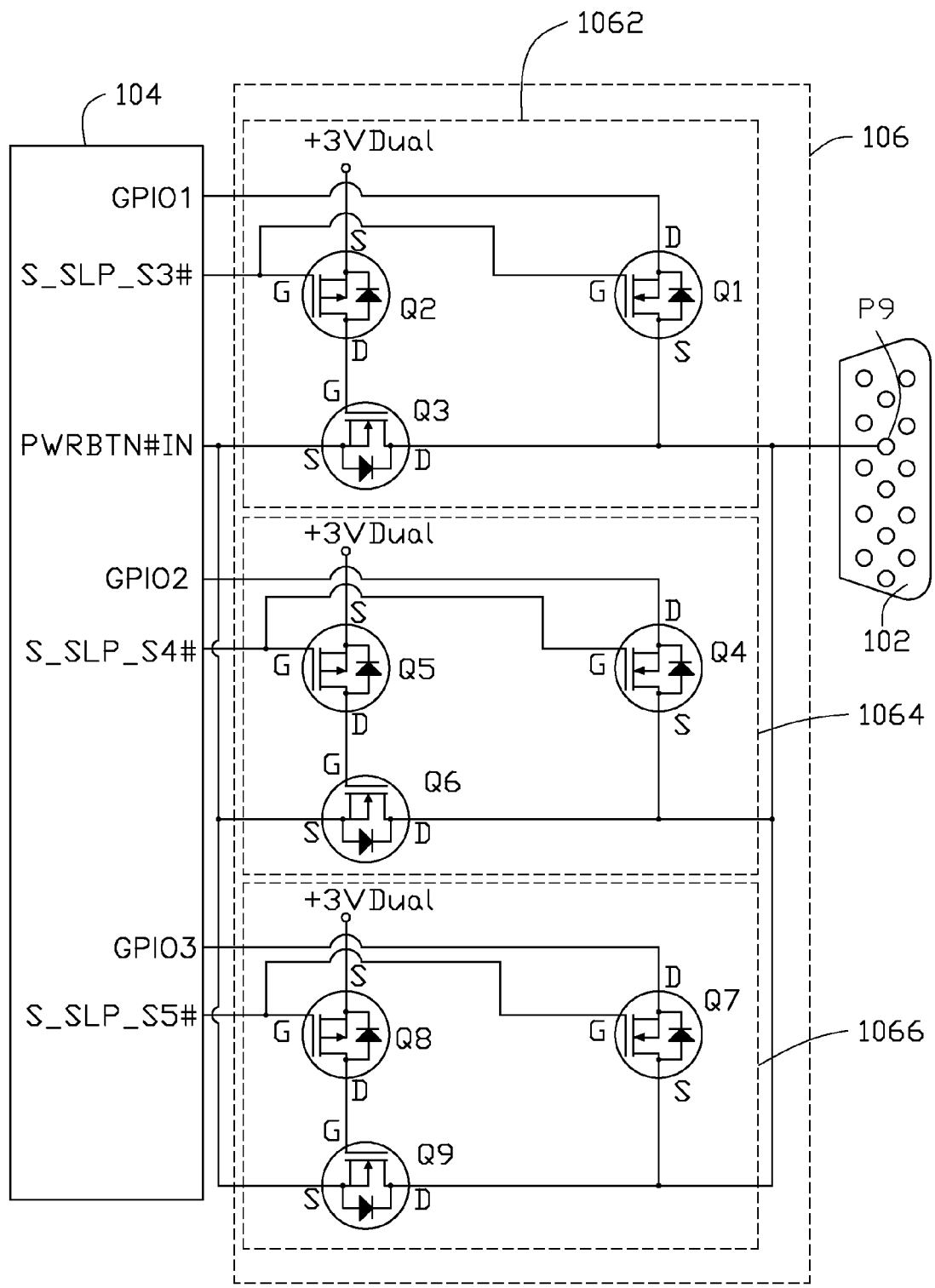
FIG. 2 is a circuit diagram of the controlling module coupled to a video graphics array (VGA) connector and a north bridge chipset of FIG. 1.

FIG. 2 illustrates that the north bridge chipset 104 can comprise a sleep terminal S_SLP_S3#, a dormant terminal S_SLP_S4#, a shutdown terminal S_SLP_S5#, a boot terminal PWRBTN#IN, a general purpose input output (GPIO) terminal GPIO1-GPIO3. The VGA connector 102 can comprise an idle pin P9.

The sleep control circuit 1062 can comprise three field effect transistors (FETs) Q1-Q3. The gate G of the FET Q1 is coupled to the sleep terminal S_SLP_S3# to obtain the sleep control signal from the north bridge chipset 104, and the drain D of the FET Q1 is coupled to the GPIO1 terminal. The gate G of the FET Q2 is coupled to the sleep terminal S_SLP_S3# to obtain the sleep control signal from the north bridge chipset 104, the source S of the FET Q2 is coupled to a dual power source+3VDUAL, and the drain D of the FET Q2 is coupled to the gate G of the FET Q3. The source S of the FET Q3 is coupled to the boot terminal PWRBTN#IN, and both the source S of the FET Q1 and the drain D of the FET Q3 are coupled to the idle pin P9 of the VGA connector 102.

The dormant control circuit 1064 can comprise three field effect transistors (FETs) Q4-Q6. The gate G of the FET Q4 is coupled to the dormant terminal S_SLP_S4# to obtain the dormant control signal from the north bridge chipset 104, and the drain D of the FET Q4 is coupled to the GPIO2 terminal. The gate G of the FET Q5 is coupled to the dormant terminal S_SLP_S4# to obtain the dormant control signal from the north bridge chipset 104, the source S of the FET Q5 is coupled to the dual power source+3VDUAL, and the drain D of the FET Q5 is coupled to the gate G of the FET Q6. The source S of the FET Q6 is coupled to the boot terminal PWRBTN#IN, and both the source S of the FET Q4 and the drain D of the FET Q6 are coupled to the idle pin P9 of the VGA connector 102.

The shutdown control circuit 1066 can comprise three field effect transistors (FETs) Q7-Q9. The gate G of the FET Q7 is coupled to the shutdown terminal S_SLP_S5# to obtain the shutdown control signal from the north bridge chipset 104, and the drain D of the FET Q7 is coupled to the GPIO3 terminal. The gate G of the FET Q8 is coupled to the shutdown terminal S_SLP_S5# to obtain the shutdown control signal from the north bridge chipset 104, the source S of the FET Q8 is coupled to the dual power source+ 3VDUAL, and the drain D of the FET Q8 is coupled to the gate G of the FET Q9. The source S of the FET Q9 is coupled to the boot terminal PWRBTN#IN, and both the source S of the FET Q7 and the drain D of the FET Q9 are coupled to the idle pin P9 of the VGA connector 102.

Figure 3:
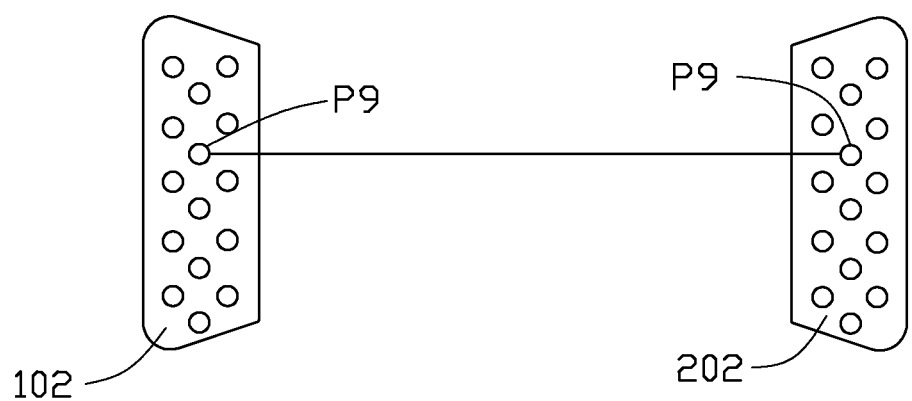
FIG. 3 is a diagrammatic view of a VGA connector of a motherboard coupled to a VGA connector of a display of FIG. 1.

FIG. 3 illustrates that the VGA connector 202 can comprise an idle pin P9. The VGA connector 102 is electrically coupled to the VGA connector 202. The idle pin P9 of the VGA connector 102 is electrically coupled to the idle pin P9 of the VGA connector 202.

When the button of the display 20 is pressed, the VGA connector 102 obtains the switch signal with low level from the idle pin P9 of the VGA connector 202, and the VGA connector 102 transmits the switch signal to the controlling module 106.

When the BIOS 108 sets the computer in the sleep mode, the sleep terminal S_SLP_S3# of the north bridge chipset outputs the sleep control signal to the sleep control circuit 1062, the sleep control circuit 1062 starts working. When the computer is fully running, the sleep control signal output by the north bridge chipset 104 is at a high level state, and the FET Q1 is turned on, both the FET Q2 and the FET Q3 are turned off. When the user leaves the computer, and the button of the display 20 is pressed, the VGA connector 102 obtains a switch signal with low level from the idle pin P9 of the VGA connector 202, and the source S of the FET Q1 obtains the switch signal with the low level, as the FET Q1 is turned on, the GPIO1 terminal of the north bridge chipset 104 obtains the first mode signal with low level from the sleep control circuit 1062, and the north bridge chipset 104 controls the computer to sleep. When the computer is sleeping, both the gate G of the FET Q1 and the gate G of the FET Q2 obtain a low level sleep control signal, the FET Q1 is turned off, the FET Q2 is turned on, and the FET Q3 is turned on. When the user comes back to the computer, and the button of the display 20 is pressed, the idle pin P9 of the VGA connector 102 transmits the switch signal with low level to the drain D of the FET Q3, and the FET Q3 is turned on, the boot terminal PWRBTN#IN of the north bridge chipset 104 obtains the switch signal with low level, at the same time, the computer is woken up.

When the BIOS 108 sets the computer in the dormant mode, the dormant terminal S_SLP_S4# of the north bridge chipset outputs the dormant control signal to the dormant control circuit 1064, the dormant control circuit 1064 starts working. When the computer is fully running, the dormant control signal output by the north bridge chipset 104 is at a high level, and the FET Q4 is turned on, both the FET Q5 and the FET Q6 are turned off. When the user leaves the computer, and the button of the display 20 is pressed, the VGA connector 102 obtains a switch signal with low level from the idle pin P9 of the VGA connector 202, and the source S of the FET Q5 obtains the switch signal with the low level, as the FET Q4 is turned on, the GPIO2 terminal of the north bridge chipset 104 obtains the second mode signal with low level from the dormant control circuit 1064, and the north bridge chipset 104 controls the computer to be dormant. When the computer is dormant, both the gate G of the FET Q4 and the gate G of the FET Q5 obtain a low level dormant control signal, the FET Q4 is turned off, the FET Q5 is turned on, and the FET Q6 is turned on. When the user comes back to the computer, and the button of the display 20 is pressed, the idle pin P9 of the VGA connector 102 transmits the switch signal with low level to the drain D of the FET Q6, and the FET Q6 is turned on, the boot terminal PWRBTN#IN of the north bridge chipset 104 obtains the switch signal with low level, at the same time, the computer is woken up.

When the BIOS 108 sets the computer in the shutdown mode, the shutdown terminal S_SLP_S5# of the north bridge chipset outputs the shutdown control signal to the shutdown control circuit 1066, the shutdown control circuit 1066 starts working. When the computer is fully running, the shutdown control signal output by the north bridge chipset 104 is at a high level, and the FET Q7 is turned on, both the FET Q8 and the FET Q9 are turned off. When the user leaves the computer host, and the button of the display 20 is pressed, the VGA connector 102 obtains a switch signal with low level from the idle pin P9 of the VGA connector 202, and the source S of the FET Q8 obtains the switch signal with the low level, as the FET Q7 is turned on, the GPIO3 terminal of the north bridge chipset 104 obtains the third mode signal with low level from the shutdown control circuit 1066, and the north bridge chipset 104 controls the computer to be turned off. When the computer is turned off, both the gate G of the FET Q7 and the gate G of the FET Q8 obtain a shutdown control signal with low level, the FET Q7 is turned off, and the FET Q8 is turned on, the FET Q9 is turned on. When the user comes back to the computer, and the button of the display 20 is pressed, the idle pin P9 of the VGA connector 102 transmits the switch signal with low level to the drain D of the FET Q9, and the FET Q9 is turned on, the boot terminal PWRBTN#IN of the north bridge chipset 104 obtains the switch signal with low level, at the same time, the computer is woken up.

While the disclosure has been described by way of example and in terms of a preferred embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A motherboard, comprising:
   a north bridge chipset outputting a sleep control signal with a first state;
   a basic input output system (BIOS) setting a sleep mode, when the north bridge chipset obtains a first mode signal, and setting a computer that includes the motherboard to be in asleep state;
   a first video graphics array (VGA) connector obtaining a switch signal; and
   a controlling module obtaining the sleep control signal with the first state from the north bridge chipset; wherein the control module is electrically coupled to the first VGA connector to receive the switch signal; wherein when the controlling module obtains the switch signal, and outputs the first mode signal to the north bridge chipset according to the switch signal and the sleep control signal with the first state, the north bridge chipset controlling the computer to be in asleep state;

wherein the north bridge chipset outputting the sleep control signal with a second state to the controlling module according the first mode signal; and wherein when the controlling module obtains the sleep control signal with the second state, and obtains the switch signal once again, the controlling module transmits the switch signal to the north bridge chipset, and the computer is waken up.

2. The motherboard of claim 1, wherein the first VGA connector comprises a first idle pin, the first VGA connector is electrically coupled to a second VGA connector of a display, the first idle pin of the first VGA connector is electrically coupled to a second idle pin of the second VGA connector.

3. The motherboard of claim 2, wherein the north bridge chipset further outputs a dormant control signal with a first state, the BIOS sets a dormancy mode, when the north bridge chipset obtains a second mode signal and controls a computer includes the motherboard to be in dormancy state;

wherein when the controlling module obtains the switch signal, and outputs the second mode signal to the north bridge chipset according to the switch signal and the dormant control signal with the first state, the north bridge chipset controls the computer to be in dormancy state;

wherein the north bridge chipset outputs the dormant control signal with a second state to the controlling module according the second mode signal; and wherein when the controlling module obtains the dormant control signal with the second state, and obtains the switch signal once again, the controlling module transmits the switch signal to the north bridge chipset, and the computer is waken up.

4. The motherboard of claim 3, wherein the north bridge chipset further outputs a shutdown control signal with a first state, the BIOS sets a shutdown mode, when the north bridge chipset obtains a third mode signal and controlling a computer includes the motherboard to be turned off;

wherein when the controlling module obtains the switch signal, and outputs the third mode signal to the north bridge chipset according to the switch signal and the shutdown control signal with the first state, the north bridge chipset controls the computer includes the motherboard to be turned off;

wherein the north bridge chipset outputs the shutdown control signal with a second state to the controlling module according the third mode signal; and wherein when the controlling module obtains the shutdown control signal with the second state, and obtains the switch signal once again, the controlling module transmits the switch signal to the north bridge chipset, and the computer is waken up.

5. The motherboard of claim 4, wherein the controlling module comprises a sleep control circuit, the north bridge chipset comprises a sleep terminal, a boot terminal, and a first general purpose input output (GPIO) terminal;

wherein the sleep control circuit comprises:

a first electronic switch comprises a first terminal electrically coupled to the sleep terminal of the north bridge chipset to receive the sleep control signal from the north bridge chipset, a second terminal electrically coupled to the first GPIO terminal, a third terminal electrically coupled to the first idle pin of the first VGA connector;

a second electronic switch comprises a first terminal electrically coupled to the sleep terminal of the north bridge chipset to receive the sleep control signal from the north bridge chipset, a third terminal electrically coupled to a power supply; and a third electronic switch comprises a first terminal electrically coupled to a second terminal of the second electronic switch, a second terminal electrically coupled to the first idle pin of the first VGA connector, a third terminal electrically coupled to the boot terminal of the north bridge chipset, and electrically coupled to the first idle pin of the first VGA connector.

6. The motherboard of claim 5, wherein the controlling module comprises a dormant control circuit, the north bridge chipset comprises a dormant terminal and a second GPIO terminal;

wherein the dormant control circuit comprises:

a fourth electronic switch comprises a first terminal electrically coupled to the dormant terminal of the north bridge chipset to receive the dormant control signal from the north bridge chipset, a second terminal electrically coupled to the second GPIO terminal, a third terminal electrically coupled to the first idle pin of the first VGA connector;

a fifth electronic switch comprising a first terminal electrically coupled to the dormant terminal of the north bridge chipset to receive the dormant control signal from the north bridge chipset, a third terminal electrically coupled to the power supply; and a sixth electronic switch comprises a first terminal electrically coupled to a second terminal of the fifth electronic switch, a second terminal electrically coupled to the first idle pin of the first VGA connector, a third terminal electrically coupled to the boot terminal of the north bridge chipset, and electrically coupled to the first idle pin of the first VGA connector.

7. A computer control system, comprising:

a display comprising a first video graphics array (VGA) connector to output a switch signal;

a motherboard comprising:

a north bridge chipset outputting a sleep control signal with a first state;

a basic input output system (BIOS) setting a sleep mode, when the north bridge chipset obtains a first mode signal and controls the computer control system to be in asleep state;

a second VGA connector electrically coupled to the first VGA connector to obtain the switch signal from the first VGA connector; and a controlling module electrically coupled to the second VGA connector to obtain the switch signal from the second VGA connector, and obtaining the sleep control signal with the first state from the north bridge chipset;

wherein when the controlling module obtains the switch signal, and outputs the first mode signal to the north bridge chipset according to the switch signal and the sleep control signal with the first state, the north bridge chipset controls the computer to be in asleep state;

wherein the north bridge chipset outputs the sleep control signal with a second state to the controlling module according the first mode signal; and wherein the controlling module obtains the sleep control signal with the second state, and obtains the switch signal once again, the controlling module transmits the switch signal to the north bridge chipset, and the computer is waken up.

8. The computer control system of claim 7, wherein first VGA connector comprises a first idle pin, the second VGA connector comprises a second idle pin, the first idle pin of the first VGA connector is electrically coupled to the second idle pin of the second VGA connector.

9. The computer control system of claim 8, wherein the north bridge chipset further outputs a dormant control signal with a first state, the BIOS sets a dormancy mode, when the north bridge chipset obtains a second mode signal and controls the computer control system to be in dormancy state;
   wherein when the controlling module obtains the switch signal, and outputs the second mode signal to the north bridge chipset according to the switch signal and the dormant control signal with the first state, the north bridge chipset controls the computer to be in dormancy state;
   wherein the north bridge chipset outputs the dormant control signal with a second state to the controlling module according the second mode signal; and
   wherein when the controlling module obtains the dormant control signal with the second state, and obtains the switch signal once again, the controlling module transmits the switch signal to the north bridge chipset, and the computer is waken up.

10. The computer control system of claim 9, wherein the controlling module comprises a sleep control circuit, the north bridge chipset comprises a sleep terminal, a boot terminal, and a first general purpose input output (GPIO) terminal;
   wherein the sleep control circuit comprises:
   a first electronic switch comprises a first terminal electrically coupled to the sleep terminal of the north bridge chipset to receive the sleep control signal from the north bridge chipset, a second terminal electrically coupled to the first GPIO terminal, a third terminal electrically coupled to the first idle pin of the first VGA connector;
   a second electronic switch comprises a first terminal electrically coupled to the sleep terminal of the north bridge chipset to receive the sleep control signal from the north bridge chipset, a third terminal electrically coupled to a power supply; and
   a third electronic switch comprises a first terminal electrically coupled to a second terminal of the second electronic switch, a second terminal electrically coupled to the first idle pin of the first VGA connector, a third terminal electrically coupled to the boot terminal of the north bridge chipset, and electrically coupled to the first idle pin of the first VGA connector.

* * * * *